United States Patent [19]

Masutani

[11] Patent Number: 5,021,661
[45] Date of Patent: Jun. 4, 1991

[54] TIME-RESOLVED INFRARED SPECTROPHOTOMETER

[75] Inventor: Koji Masutani, Tokyo, Japan

[73] Assignee: Jeol Ltd., Tokyo, Japan

[21] Appl. No.: 577,636

[22] Filed: Sep. 4, 1990

[30] Foreign Application Priority Data

Sep. 4, 1989 [JP] Japan .................................. 1-230209
Dec. 25, 1989 [JP] Japan .................................. 1-335748

[51] Int. Cl.⁵ .......................... G01J 3/45; G01J 3/443
[52] U.S. Cl. ................................... 250/339; 356/318; 356/346; 250/458.1
[58] Field of Search ............ 250/339, 341, 343, 458.1; 306/317, 318, 346

[56] References Cited

U.S. PATENT DOCUMENTS

| | | | |
|---|---|---|---|
| 3,868,185 | 2/1975 | Geenzel et al. | 250/339 |
| 4,054,384 | 10/1977 | Hawes | 356/346 |
| 4,847,878 | 7/1989 | Badeau | 250/339 |
| 4,925,307 | 5/1990 | Cremers et al. | 356/318 |

Primary Examiner—Carolyn E. Fields
Assistant Examiner—Drew A. Dunn
Attorney, Agent, or Firm—Webb, Burden, Ziesenheim & Webb

[57] ABSTRACT

A time-resolved infrared spectrophotometer capable of investigating samples exhibiting short periods of response to stimuli. The spectrophotometer comprises a rapid scan interferometer, a stimulus generator periodically producing a stimulus not in synchronism with the reference signal produced by the interferometer, a detector detecting the radiation emerging from the interferometer, a variable delay circuit producing a trigger signal after a delay with respect to the stimulus, a gate circuit converting the output from the detector into a discrete form in response to the trigger signal, a low-pass filter for detecting the envelope of the output from the gate circuit, an analog-to-digital converter converting the output from the filter into digital form, and a CPU which takes the Fourier transform of the output from the converter, for obtaining a spectrum.

8 Claims, 7 Drawing Sheets

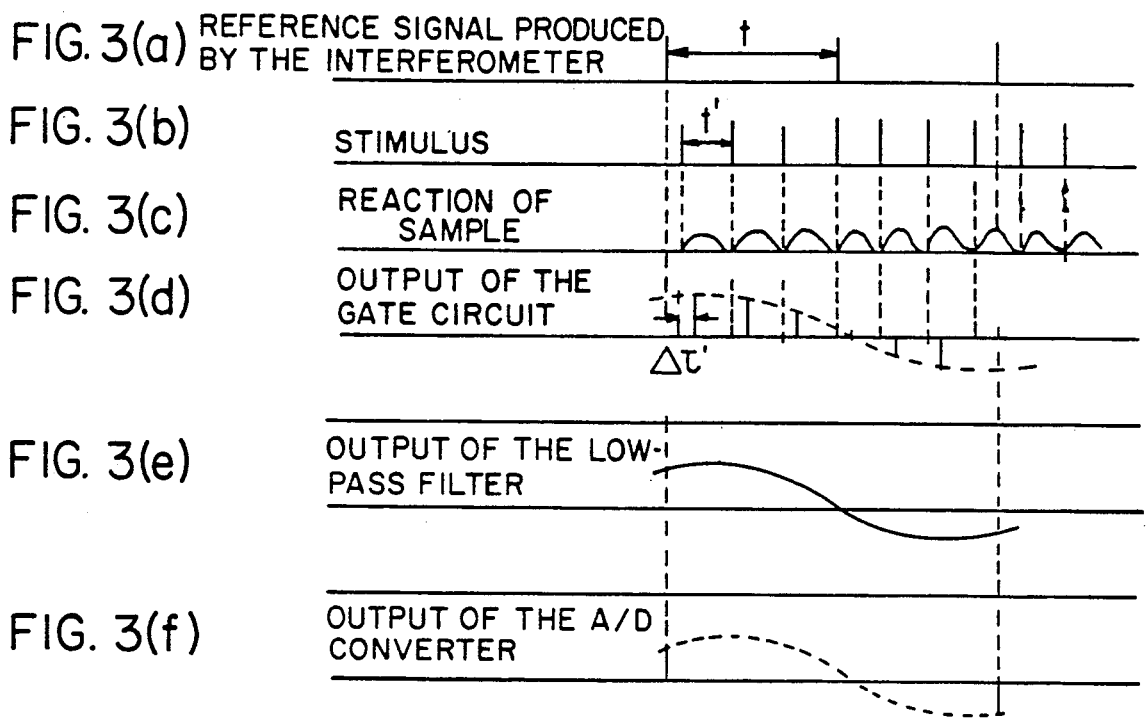
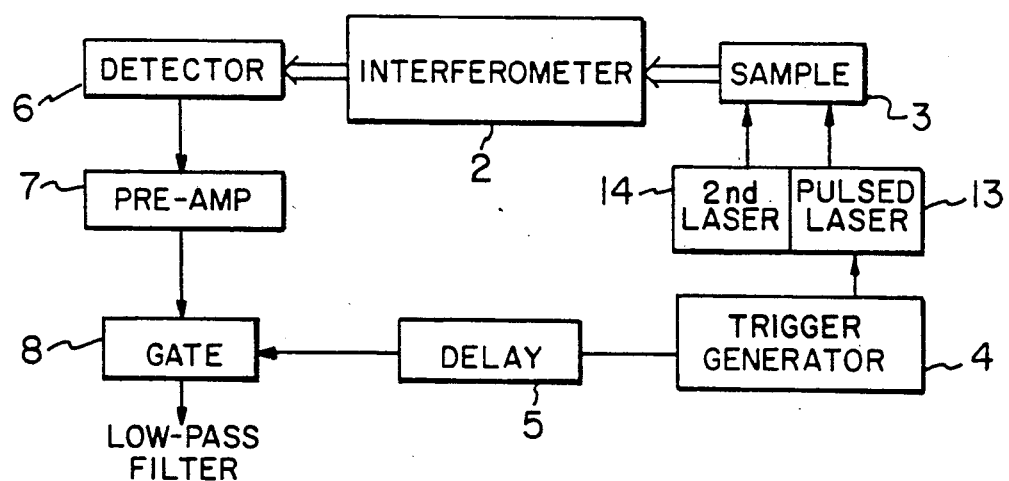
FIG. 5

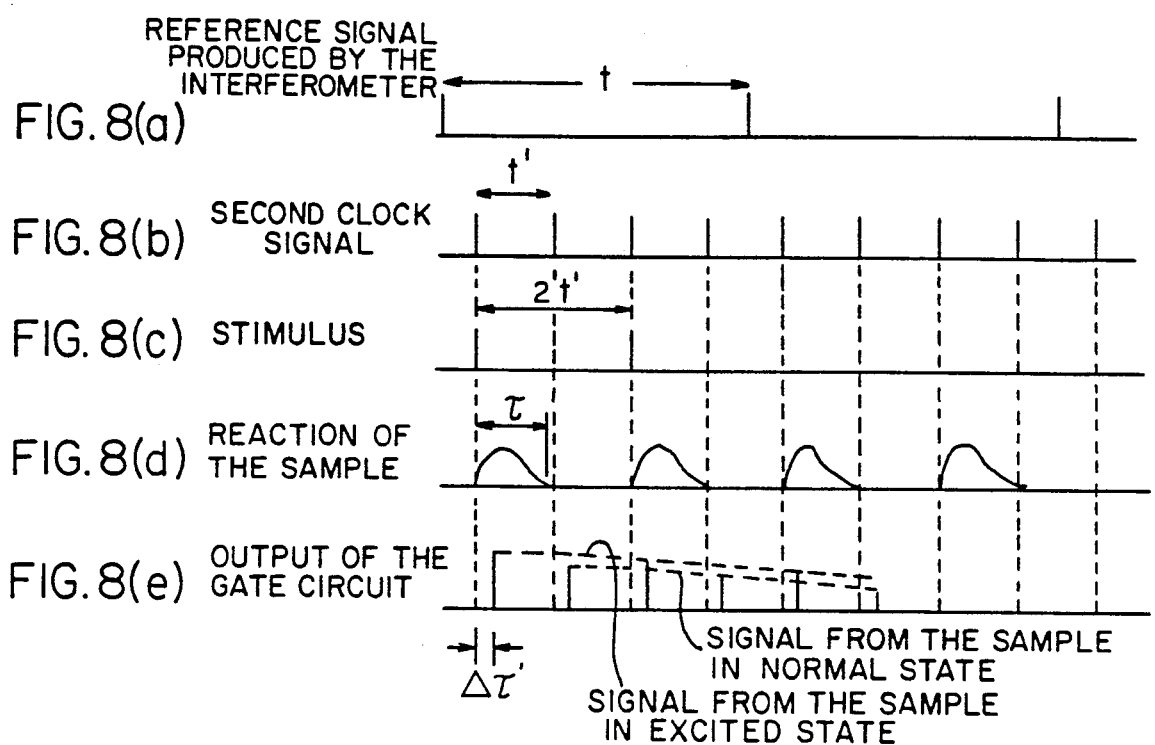
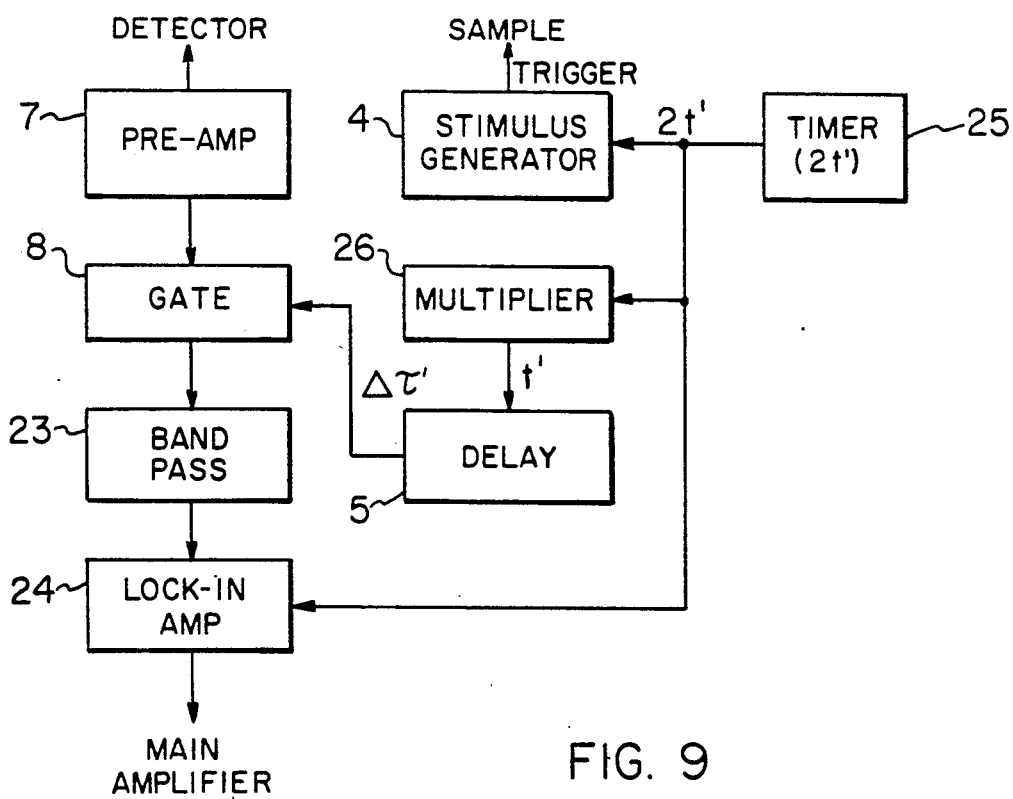

TIME-RESOLVED INFRARED SPECTROPHOTOMETER

FIELD OF THE INVENTION

The present invention relates to a time-resolved infrared spectrophotometer in which a periodically generated stimulus is applied to an object or specimen under investigation. The output from a detector is sampled using a rapid scan interferometer to obtain an interferogram after a delay with respect to each stimulus. A spectrum is derived by means of Fourier transformation for investigating the state of an object or specimen that repeatedly exhibits the same response to a stimulus.

BACKGROUND OF THE INVENTION

In evaluating the characteristics of a liquid crystal and in various other applications, it has been required to investigate the response of a sample in the process of relaxation after stimuli are periodically given to the sample by an electrical means, laser, or other means. For this purpose, time-resolved spectrophotometry using a Fourier transform infrared spectrophotometer is available. Since this spectrophotometry is capable of measurement with high signal-to-noise ratio over a wide range of wave numbers, the method has been developed and utilized for years. Two types of time-resolved spectrophotometry exist. One uses a rapid scan interferometer, while the other employs a step scan interferometer.

FT IR spectrophotometry uses an interferometer consisting of a beam splitter, a moving mirror, and a fixed mirror. The moving mirror is moved to obtain an interferogram. For this purpose, the characteristics of the sample including the transmissivity must be constant during a period of obtaining an interferogram. If the characteristics vary, incorrect information will appear after the signal from the sample is Fourier-transformed. In time-resolved spectrophotometry, the period of the imparted stimuli must be longer than the period of the reaction process. Since periodic stimulus is given independent of the movement of the moving mirror, it is necessary to match the movement to the application of the stimulus. In the past, therefore, stimuli have been given in synchronism with a reference signal produced by the interferometer.

In time-resolved spectrophotometry using a rapid scan interferometer, stimuli are given in synchronism with the reference signal produced by the interferometer as described above, and interferograms are taken. Therefore, samples can be classified into the following three types according to the period of the reaction of each sample.

(1) Where the response to the stimulus is very slow ($\tau > T$).

That is, the period $\tau$ of the reaction or other similar change of state of the sample is longer than the period of one scan T of the moving mirror, i.e., the time taken for the interferometer to make one measurement to obtain one full interferogram.

(2) Where the response to the stimulus is relatively slow ($t < \tau < T$).

That is, the period $\tau$ is longer than the sampling interval t at which the signal is sampled, for creating an interferogram.

(3) Where the response to the stimulus is very fast ($\tau < t$).

In the case (1) above, the period $\tau$ of response of the sample is longer than the period T of a scan of the moving mirror. Therefore, if the moving mirror is forced to make a faster scan as shown in FIG. 1(a), an interferogram is taken with some delay with respect to the imparted stimulus. A spectrum of the sample in a desired state can be obtained by Fourier-transforming the interferogram.

In the case (2) above, the period of response is shorter and so plural scans are made by the interferometer as shown in FIG. 1(b). In particular, stimuli are given at intervals t determined by the reference signal produced by the interferometer. The data which have the same delay time and are obtained from the first scan, the second scan, and so on are separately gathered and then organized into an interferogram. Thus, a spectrum of the sample in a certain state is derived.

In the case (3) above, the period $\tau$ of response is shorter than the sampling interval t. As shown in FIG. 1(c), a stimulus is repeatedly given in synchronism with the reference signal produced by the interferometer. Measurements are made with a given delay time $\Delta\tau$. An interferogram is created by organizing data having the same delay time. As a result, a spectrum of a sample in a certain state is obtained.

The prior art time-resolved spectrophotometry has several problems. Especially, in the case (3) above, synchronization with the reference signal produced by the interferometer is needed. Also, very quick measurements are necessitated. As an example, when measurements should be made at 100 points in a time interval of 100 $\mu$s, each measurement must be made in 1 $\mu$s. Therefore, a very large amount of data must be gathered and processed after each scan of the moving mirror. Furthermore, each set of data must be distinguished after the measurements. The data having the same delay time must be organized. Hence, the FT IR spectrophotometer must have a high-speed sampling mechanism, data organization function, and other functions which are not normally incorporated.

When the period of reaction is shorter than the sampling interval, the period between the end of the reaction and the next sampling is useless. This deteriorates the efficiency of measurement.

In the above-described example, stimuli are give in synchronism with the reference signal produced by the interferometer. It is difficult to realize such synchronization. Where naturally periodic stimuli are excited, no measurement can be made by the above-described method.

SUMMARY OF THE INVENTION

It is an object of the present invention to provide a time-resolved infrared spectrophotometer capable of measuring characteristics of samples having short reaction periods not in synchronism with the reference signal produced by the interferometer.

A time-resolved infrared spectrophotometer according to the invention comprises a rapid scan interferometer, a stimulating means for periodically giving a stimulus to a sample placed in the optical path inside the interferometer, a delay means producing a trigger signal after a delay of a given time with respect to the stimulation made by the stimulating means, a detector detecting the radiation emerging from the interferometer, a sampling means which converts the output signal from the detector into a discrete form in response to the trigger signal, a means for detecting the envelope of the output signal from the sampling means, and a Fourier transform means which Fourier-transforms the detected envelope to obtain a spectrum.

Another time-resolved infrared spectrophotometer according to the invention comprises a rapid scan interferometer, a stimulating means for periodically giving a stimulus to a sample placed in the optical path inside the interferometer, a clock-generating means which generates a first clock signal supplied to the stimulating means and a second clock signal having a frequency twice as high as the frequency of the first clock signal, a delay means for delaying the second clock signal, a detector detecting the radiation emerging from the interferometer, a sampling means which converts the output signal from the detector into a discrete form in response to the output signal from the delay means, a band-pass filter which receives the output signal from the sampling means and the center frequency of which is equal to the frequency of the second clock signal, a lock-in amplifier synchronizing with the second clock signal and receiving the output from the band-pass filter, and a Fourier transform means which Fourier-transforms the output signal from the lock-in amplifier to obtain a spectrum.

The novel time-resolved infrared spectrophotometer includes a gate circuit connected to the output of a detector, a low-pass filter connected with the gate circuit, and a delay means which controls the gate circuit in response to each stimulus after a given delay time. The stimulus is produced not in synchronism with the reference signal produced by the interferometer. The output signal from the detector is sampled after a desired delay time. An interferogram is obtained for the given delay time. A spectrum is obtained by Fourier-transforming the interferogram. The measurement is repeated with successively different delay times to derive a set of spectra at intervals of time, corresponding to the different delay times. Since the synchronization of the stimulus with the interferometer is not needed, a quick reaction can be measured by increasing the frequency of stimuli irrespective of the reference signal produced by the interferometer. Also, the invention is applicable to a time-resolved infrared spectrophotometer which is similar to the prior art instrument using a rapid scan interferometer except that simple means are added.

Other objects and features of the invention will appear in the course of the description thereof which follows.

BRIEF DESCRIPTION OF THE DRAWINGS

FIG. 3 is a waveform diagram illustrating the operation of the spectrophotometer shown in FIG. 2;

FIGS. 4, 5, 6, and 7 are block diagrams of other time-resolved infrared spectrophotometers according to the invention;

FIG. 8 is a waveform diagram illustrating the operation of the spectrophotometer shown in FIG. 7;

FIG. 9 is a block diagram of a clock signal generator and associated components, the clock signal generator being different from the clock signal generator of the spectrophotometer shown in FIG. 7.

DETAILED DESCRIPTION OF THE INVENTION

Figure 1A:
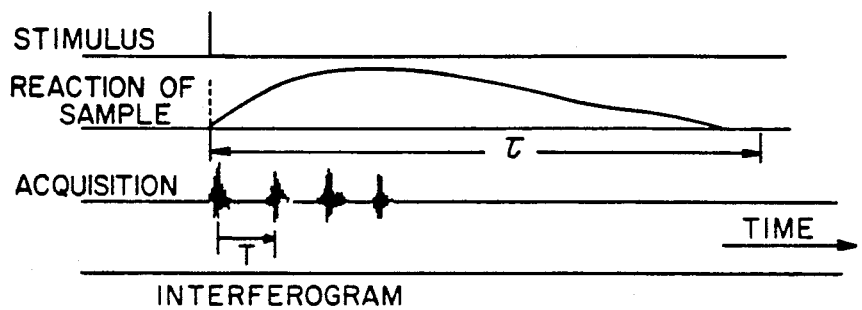
FIGS. 1(a), 1(b), and 1(c) are diagrams illustrating the prior art time-resolved infrared spectrophotometry.
Figure 1B:
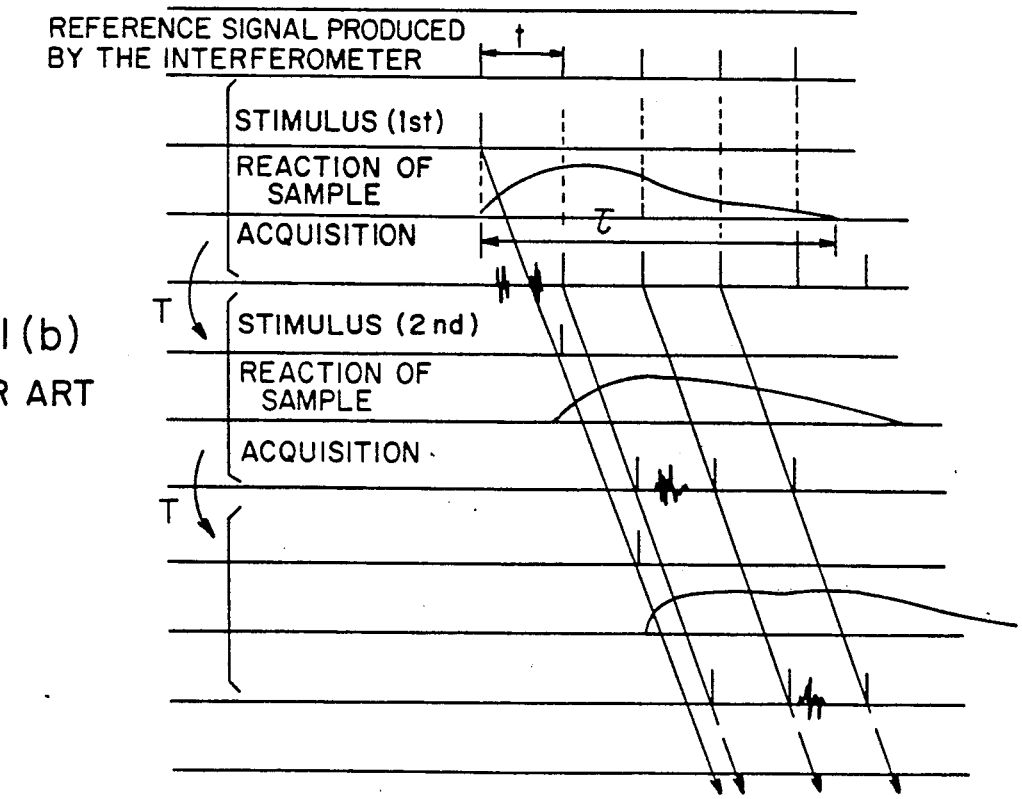
Figure 1C:
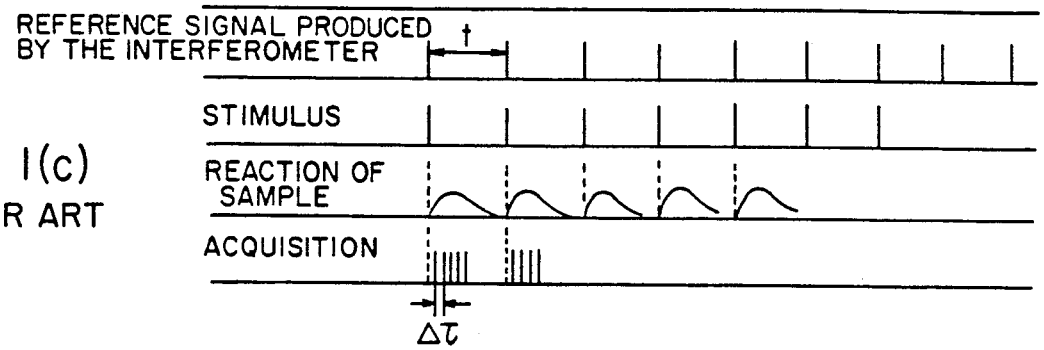
Figure 2:
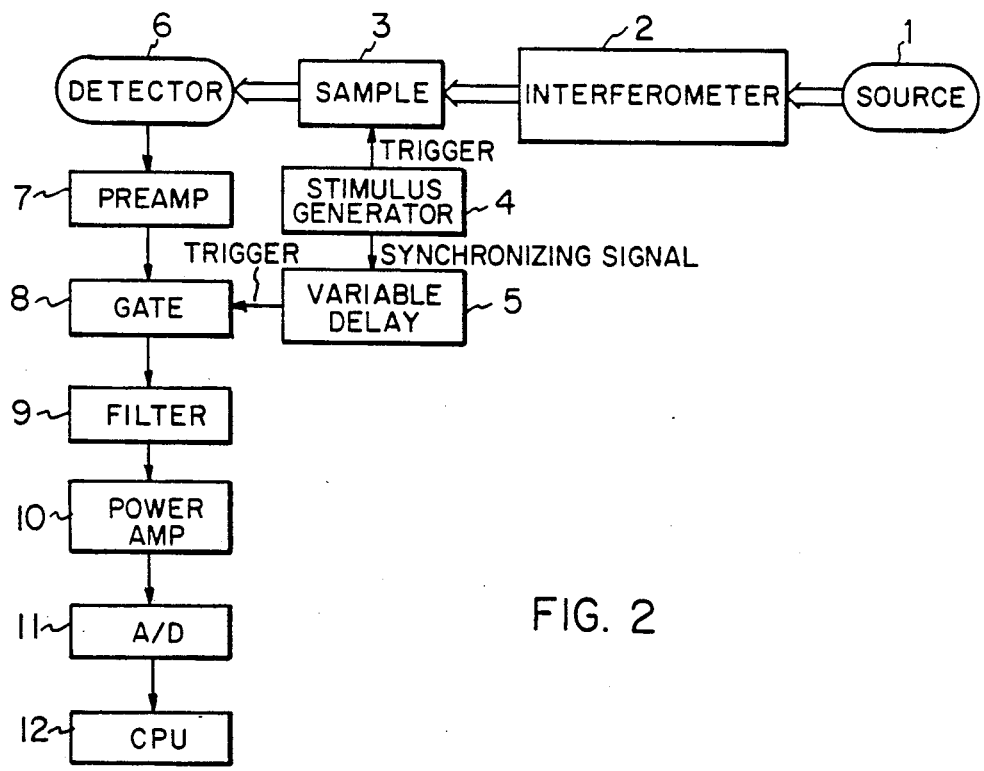
FIG. 2 is a block diagram of a time-resolved infrared spectrophotometer according to the present invention.

Referring to FIG. 2, there is shown a time-resolved infrared spectrophotometer according to the invention. This instrument comprises a light source 1, an interferometer 2 on which the radiation from the light source 1 impinges, a sample 3 placed in such a way that the radiation emerging from the interferometer 2 strikes the sample 3, a variable delay circuit 5, a stimulus generator 4 disposed between the sample 3 and the delay circuit 5, a detector 6, a preamplifier 7 acting to detect the output signal from the detector 6, a gate circuit 8 connected to the output of the preamplifier 7, a low-pass filter 9 connected to the output of the gate circuit 8, a power amplifier 10 connected to the output of the filter 9, an analog-to-digital converter 11 connected to the power amplifier 10, and a CPU 12 connected to the output of the converter 11.

The stimulus generator 4 produces a stimulus or trigger signal with a certain period t' (FIG. 3(b)) not in synchronism with a reference signal (FIG. 3(a)) produced by the interferometer 2. The stimulus generator 4 also produces a synchronizing signal to the variable delay circuit 5, which produces a trigger signal after a certain delay time of $\Delta\tau'$ to control the gate circuit 8. The gate circuit 8 has a sufficiently narrow gate duration compared with the period t', in the same way as the A/D converter. The gate circuit 8 passes its input signal only during the gate duration. As a result, the gate circuit 8 delivers a discrete signal (FIG. 3(d)). That is, the gate circuit 8 passes the repeating signal (i.e., the output signal from the preamplifier 7) with certain delay with respect to the generation of each stimulus. In other words, the output signal from the preamplifier 7 is sampled at points delayed by a certain time with respect to the stimuli. In this way, a discrete interferogram is obtained. The low-pass filter 9 removes higher harmonics from the output signal from the gate circuit 8 to extract the envelope of the output signal from the gate circuit 8. As a result, the discrete interferogram is converted into an ordinary analog signal.

The sample 3 investigated by the above-described instrument repeatedly responds identically to the stimuli. The period $\tau$ of the reaction of the sample is shorter than the intervals t at which the interferogram is sampled.

In the above-described structure, when the sample 3 does not vary, the output signal from the detector 6 is given by $$i\ F(x) = \int B(\sigma)(1+\cos 2\pi\sigma x)\,d\sigma \qquad (1)$$

where $\sigma$ is the wave number $=1/\lambda$. When a stimulus is given to the sample 3, the output signal from the detector 6 is gated to the low-pass filter 9 by the gate circuit 8 with a given delay $\Delta\tau'$ and sampled at regular intervals. The output signal from the gate circuit 8 is a function including a comb function $III_t$ consisting of equi-spaced delta functions, and given by $$F(x) = \int B'(\sigma, \Delta\tau') III_{t'}(t-\Delta\tau')(1+\cos 2\pi\sigma x)\,d\sigma \qquad (2)$$

Letting v be the velocity of the moving mirror of the interferometer, we have the relation $x = 2vt$. Since the stimuli given periodically are not synchronous with the movement of the moving mirror, the stimuli are not in phase with the movement. Of $(1+\cos 2\pi\sigma x)$ included in equation (2) above, only the term including cos2 $\pi\sigma x$ can be transformed into a spectrum. If only this term is extracted, the output is given by $$F''(x) = III_{t'}(t-\Delta\tau') \int B'(\sigma, \Delta\tau') \cos 2\pi\sigma x\, d\sigma$$

In order to see the output from the low-pass filter 9 when the above signal is passed through the filter, we now Fourier-transform $$III_{t'}(t-\Delta\tau')$$

with respect to t.
Thus, $$\int III_{t'}(t - \Delta\tau')\, e^{-i2\pi ft}\, dt = e^{-i2\pi f\Delta\tau'}\, (1/t')\, III_{1/t'}(f) = \quad (3)$$

$$1/t'\, [\delta(f) + \delta(f - 1/t')\, e^{-i2\pi(\Delta\tau'/t')} + \ldots +$$

$$\delta(f + 1/t')\, e^{+i2\pi(\Delta\tau'/t')} + \ldots$$

This is a comb function, too, and appears at intervals that are the reciprocals of the sampling intervals. Therefore, if the signal is passed through the low-pass filter 9, then we have $$F'''(x) = 1/t' \int B'(\sigma, \Delta\tau') \cos 2\pi\sigma x\, d\sigma \quad (4)$$

The output signal from the filter 9 is represented by this formula. Comparison of equation (4) with equation (1) shows that F''(x) represents the interferogram of the sample at the instant delayed by $\Delta\tau'$ with respect to the application of a stimulus. The output signal from the power amplifier 10 is converted into digital form by the A/D converter 11 at sampling intervals determined by the wave number range of the signal. Then, the CPU 12 takes the Fourier transform of the interferogram. Consequently, a spectrum of the sample can be obtained after delay $\Delta\tau'$ with respect to the application of the stimulus.

The present invention is not limited to the above example, but rather various modifications are possible. For instance, the function of the gate circuit may be performed by the A/D converter. The output signal from the detector may be synchronized directly with the trigger signal from the stimulus generator by turning on and off the input voltage to the detector in synchronism with the trigger signal.

Figure 4:
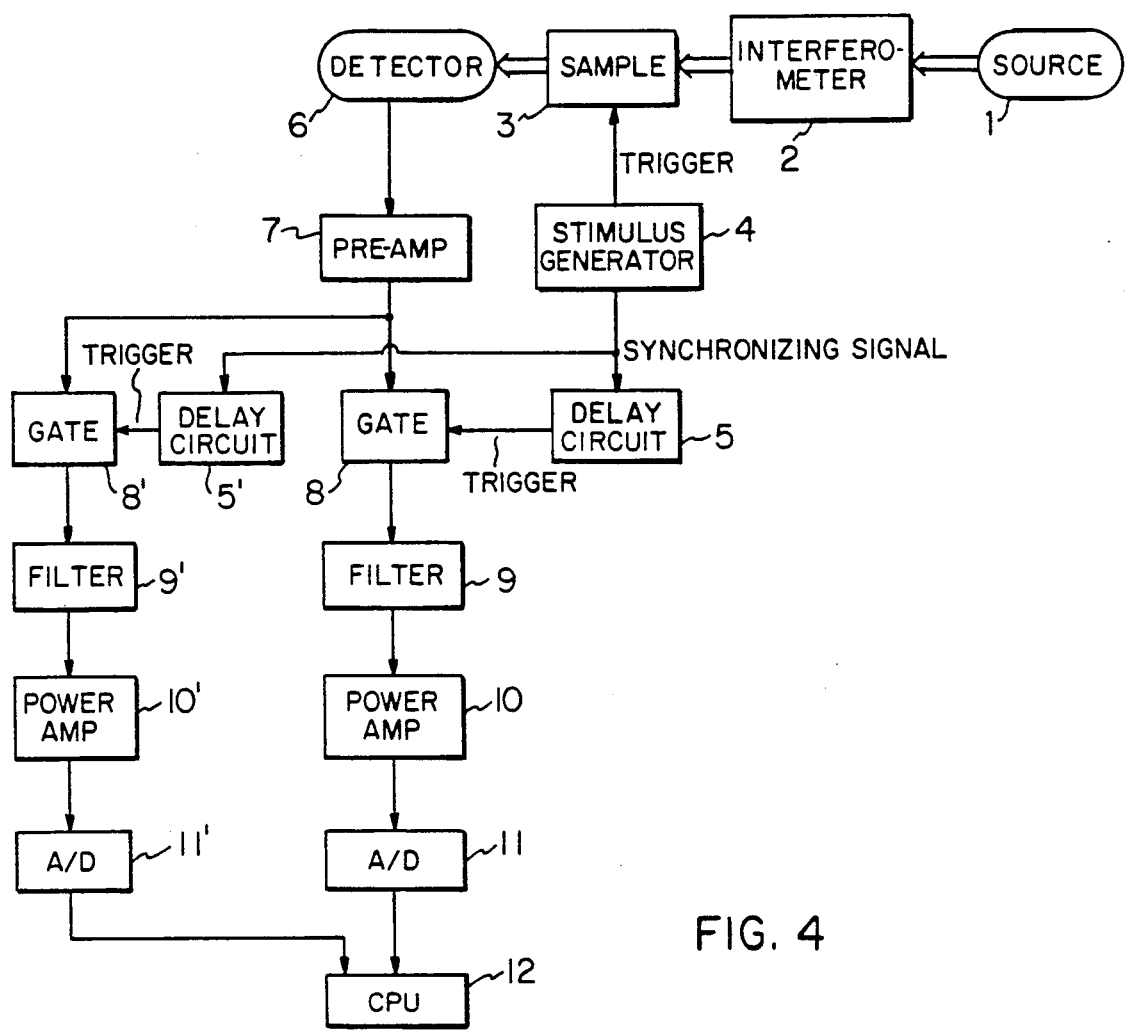

Referring to FIG. 4, there is shown another time-resolved infrared spectrophotometer according to the invention. This spectrophotometer is similar to the infrared spectrophotometer shown in FIG. 2 except that a second delay circuit 5', a second gate circuit 8', a second low-pass filter 9', a second power amplifier 10', and a second A/D converter 11' are added. In this structure, different delay times are set by the delay circuits 5 and 5'. Therefore, interferograms can be obtained with different delay times in one measurement. Interferograms can be derived with more delay times at one time by adding further sets of these components.

Referring next to FIG. 5, there is shown a Fourier-transform Raman spectrometer according to the invention. This spectrometer comprises an interferometer 2, a detector 6 acting to detect radiation emerging from the interferometer 2, a preamplifier 7 connected to the output of the detector 6, a gate circuit 8 connected to the output of the preamplifier 7, a pulsed laser 13 producing laser radiation to excite a sample 3 placed in front of the laser 13, a second laser 14 for inducing Raman scattering, a trigger generator 4 producing a trigger signal to the pulsed laser 13, a delay circuit 5 inserted between the gate circuit 8 and the trigger generator 4. The output of the gate circuit 8 is connected to a low-pass filter. The trigger signal from the trigger generator 4 is supplied to the pulsed laser 13 while the sample 3 is continuously illuminated with the Raman scattering laser radiation from the second laser 14. The laser pulses strike the sample 3 with a given period to stimulate the sample. As a result, the laser radiation emitted from the pulsed laser 13 undergoes Raman scattering in the sample. The scattered radiation is introduced into the interferometer 2. The radiation emerging from the interferometer 2 impinges on the detector 6 and is detected by it. The trigger signal from the stimulus generator 4 is fed to the gate circuit 8 after being delayed by $\Delta\tau'$ by means of the variable delay circuit 5. The gate circuit 8 is enabled by the delayed signal.

In the present example, a Raman spectrum can be obtained from the sample when the delay time set by the delay circuit 5 elapses since the sample is stimulated with each laser pulse.

Figure 6:
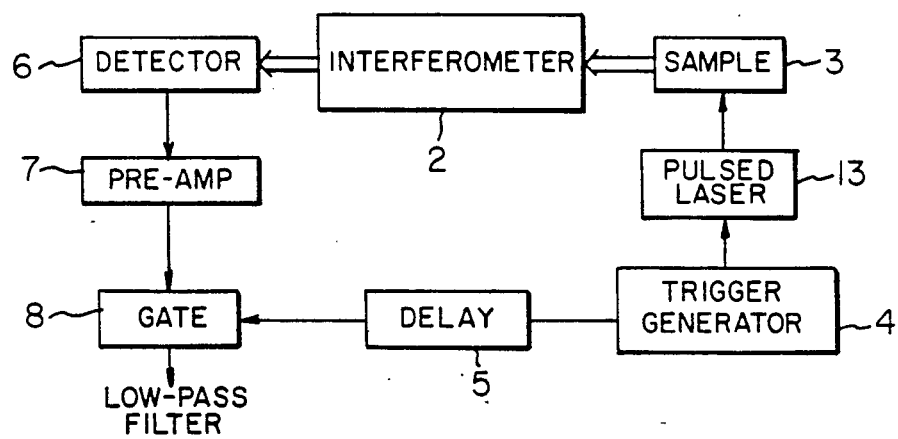

Referring to FIG. 6, there is shown a Fourier-transform photoluminescence spectrometer according to the invention. This instrument is similar to the FT Raman spectrometer shown in FIG. 5 except that the laser 14 for inducing Raman scattering is removed.

In the present example, a substance exhibiting photoluminescence is selected as the sample 3. That is, when the sample is illuminated with laser pulses, the sample emits light or fluorescence. The pulsed laser 13 produces laser pulses with a suitable period to the sample. Radiation emanating from the sample is guided to the interferometer 2. Radiation emerging from the interferometer is directed to the detector 6. Also in this example, a spectrum of the sample is obtained after the delay time set by the delay circuit 5 passes since the sample is stimulated with each laser pulse.

Figure 7:
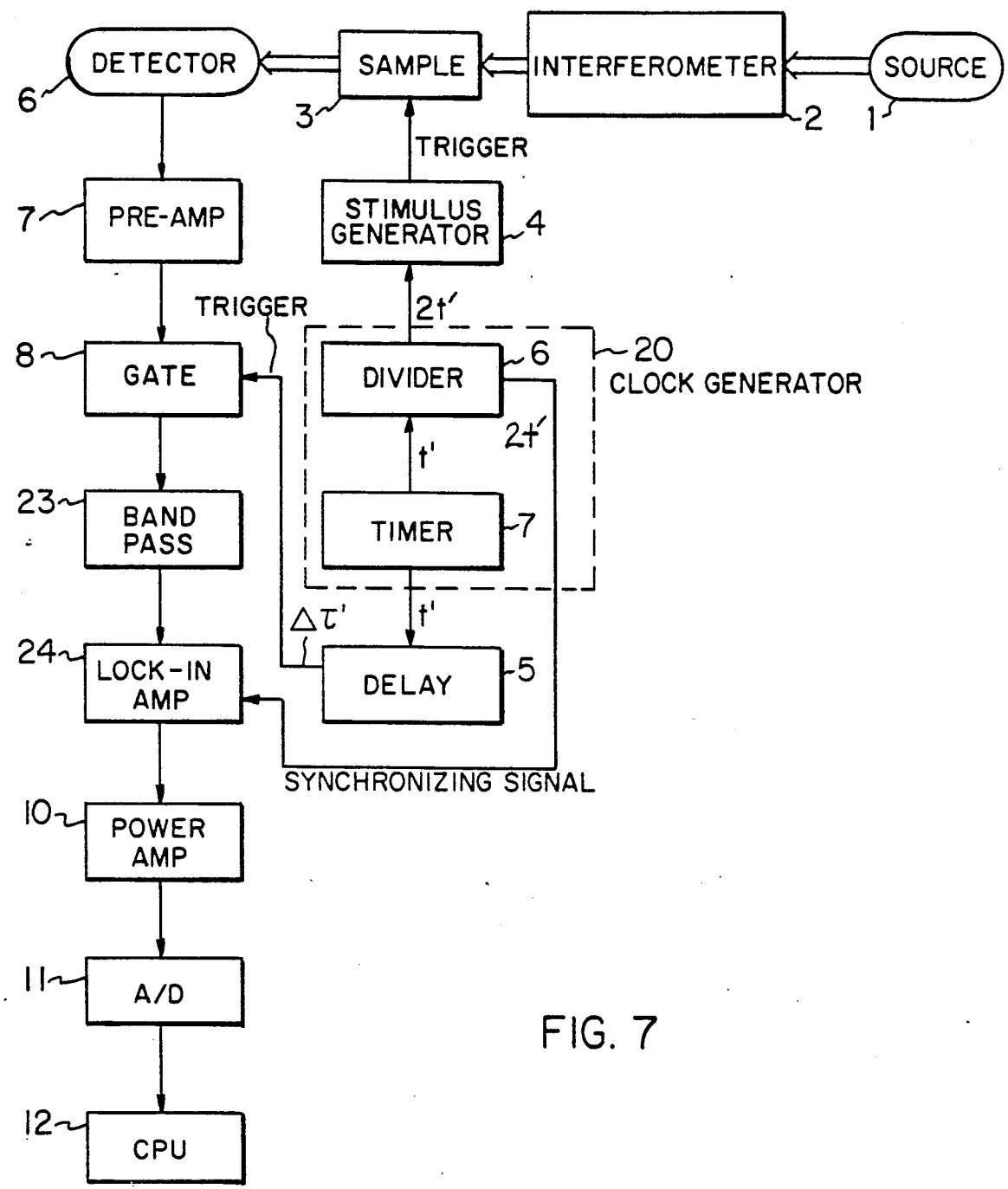

Referring to FIG. 7, there is shown a further time-resolved infrared spectrophotometer according to the invention, the spectrophotometer producing a differential interferogram. This instrument is similar to the instrument shown in FIG. 2 except that a clock signal generator 20 is inserted between the stimulus generator 4 and the variable delay circuit 5, and that a band-pass filter 23 and a lock-in amplifier 24 are inserted between the gate circuit 8 and the power amplifier 10. The clock signal generator 20 consists of a timer 21 and a $\frac{1}{2}$ frequency divider 22. The generator 20 produces a first clock signal (FIG. 8(c)) having period 2t' and a second clock signal (FIG. 8(b)) having period t'. The first clock signal is supplied to the stimulus generator 4, while the second clock signal is sent to the gate circuit 8 via the delay circuit 5. The output signal from the gate circuit 8 is furnished to the power amplifier 10 via the band-pass filter 23 and the lock-in amplifier 24. The first clock signal is supplied to the amplifier 24 as its synchronizing signal.

The stimulus generator 4 gives stimuli to the sample 3 in response to the first clock signal asynchronously with the reference signal (FIG. 8(a)) produced by the interferometer 2. The variable delay circuit 5 generates a trigger signal delayed by a given time $\Delta\tau'$ with respect to the clock signal from the timer 21 to control the gate circuit 8. The gate duration of the gate circuit 8 is sufficiently short compared with the period t'. The gate circuit 8 passes its input signal only when the trigger signal is present, as shown in FIG. 8(e). When the sample is in excited state, the output signal from the gate circuit 8 is given by $$III_{2t'}(t-\Delta\tau') \int B'(\sigma, \Delta\tau')\cos 2\pi\sigma x\, d\sigma$$

When the sample is in its normal state, the output signal from the gate circuit 8 is given by $$III_{2t'}(t-\Delta\tau'-t') \int B(\sigma)\cos 2\pi\sigma x\, d\sigma$$

That is, these two signals alternately appear at the output of the gate circuit 8. The band-pass filter 23 is used to removed the higher harmonics and the DC component of the output signal from the gate circuit 8.

In order to discuss the output signal from the band-pass filter 23 which passes the output signal from the gate circuit 8, we take the Fourier transform of $III_{2t'}(t-\Delta\tau')$ with respect to t.

$$\int III_{2t'}(t-\Delta\tau') e^{-i2\pi ft}\, dt = e^{-i2\pi f/\Delta\tau'}(1/2t') \times III_{1/2t'}(f) = \quad (5)$$
$$\tfrac{1}{2}t'\,[\delta(f) + \delta(f-\tfrac{1}{2}t')\,e^{-i2\pi(\Delta\tau'/2t')} + \delta(f-1/t')\,e^{-i2\pi(\Delta\tau'/t')} + \ldots$$
$$\delta(f+\tfrac{1}{2}t')\,e^{i2\pi(\Delta\tau'/2t')} + \ldots]$$

We now pay attention to this second term. The second term of the Fourier transform of $III_{2t'}(t-\Delta\tau'-t')$ is given by $$\tfrac{1}{2}t'\,\delta(f-\tfrac{1}{2}t')\,e^{-i2\pi(1/2t')(\Delta\tau'+t')} = -\tfrac{1}{2}t'\,\delta(f-\tfrac{1}{2}t')$$
$$e^{-i2\pi(\Delta\tau'/2t')} \quad (6)$$

Both show that the spectra obtained by Fourier transformation are sidebands having frequency $\tfrac{1}{2}t'$ and phases $2\pi(\Delta\tau'/2t')$. Both terms have an antiphase relation to each other. The band-pass filter 23 is designed to pass only these two terms. Therefore, the center frequency of the pass band of the band-pass filter is given by $\tfrac{1}{2}t'$. The limits of the bandwidth are given by $B(\sigma)$ and $2B'(\sigma, \Delta\tau')$, respectively. The output signal from the band-pass filter is the interferogram given by $$\int\{B'(\sigma, \Delta\tau')-B'(\sigma)\}\cos 2\pi\sigma x\, d\sigma$$

This interferogram is modulated at frequency $\tfrac{1}{2}t'$. The above formula is taken from equations (5) and (6). The output signal from the filter is fed to the lock-in amplifier 12 and synchronized with the reference signal having frequency $\tfrac{1}{2}t'$. The output signal from the amplifier 12 is given by $$(\tfrac{1}{2}t') \int\{B'(\sigma, \Delta\tau')-B(\sigma)\}\cos 2\pi\sigma x\, d\sigma$$

This is the difference between ferogram obtained from the sample in excited state and an interferogram obtained from the sample in normal state. The output signal from the amplifier is supplied via the A/D converter 11 to the CPU 12, which then takes the Fourier transform of its incoming signal. As a result, a differential spectrum given by $B'(\sigma, \Delta\tau')-B(\sigma)$ is obtained. Since the input signal to the A/D converter 11 takes the form of the difference between two spectra, the input signal is compressed and so the A/D converter 11 is not required to have a wide dynamic range. Hence, it is unlikely that the A/D converter 11 deteriorates the signal-to-noise ratio.

In the above example, the timer 21 produces a clock signal with period t' to the variable delay circuit 5. The clock signal is also applied to the frequency divider 22, so that a clock signal having period 2t' is supplied to the stimulus generator 4.

FIG. 9 shows a modified example, in which a timer 25 produces a clock signal with period 2t' to the stimulus generator 4. The clock signal from the timer 25 is also fed to a frequency multiplier 26 whose output frequency is twice as high as its input frequency. The output signal is fed to the variable delay circuit 5. As described thus far, this time-resolved infrared spectrophotometry creates a differential interferogram. This spectrophotometry has the advantage that measurements can be made without being affected by the condition of the instrument or by changes in the environment.

Figure 10:
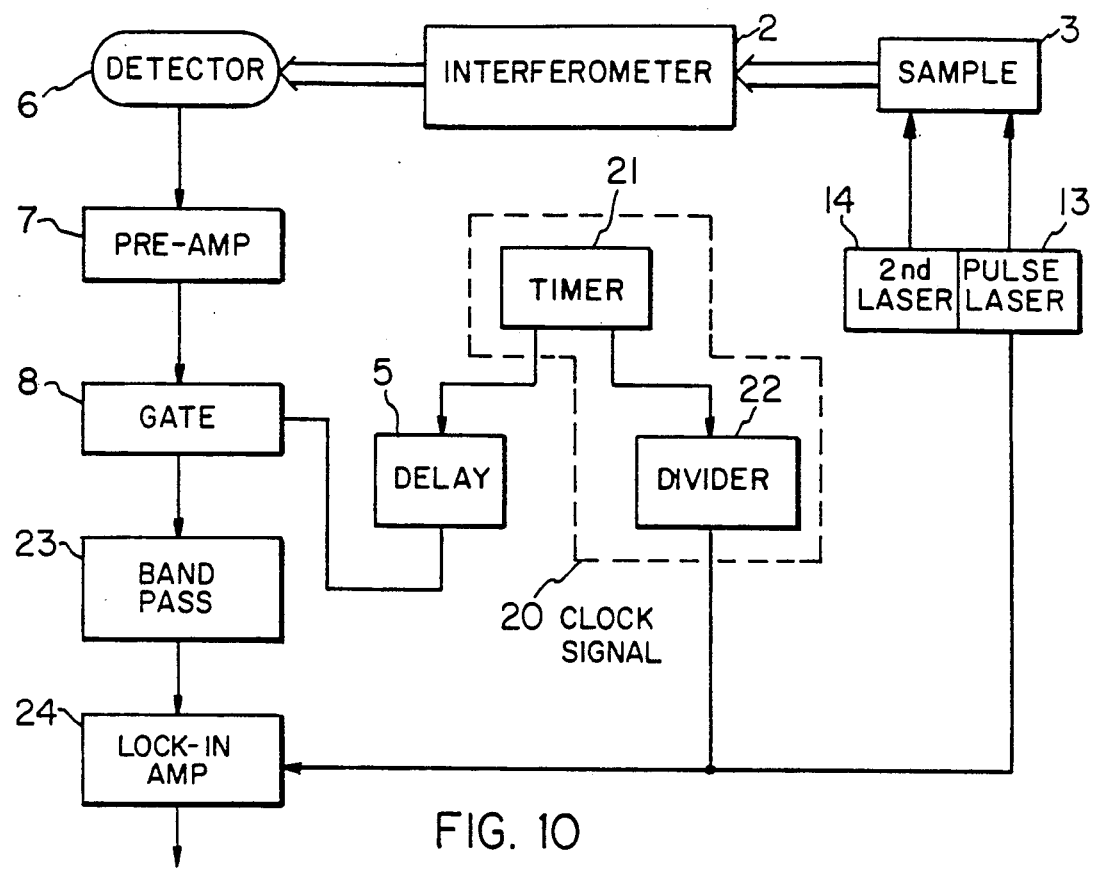
FIGS. 10 and are block diagrams of still other time-resolved infrared spectrophotometers according to the invention.

Referring to FIG. 10, there is shown an FT Raman spectrometer similar to the FT Raman spectrometer shown in FIG. 5 except that a clock signal generator 20 is added and that a band-pass filter 23 and a lock-in amplifier 24 are connected in series with the gate circuit 8, for creating a differential interferogram in accordance with the invention. The clock signal having period 2t' is supplied from the frequency divider 22 of the clock signal generator 20 to the pulsed laser 13 to trigger the laser into action while the sample 3 is constantly illuminated with the Raman scattering laser radiation from the laser 14. The sample 3 is illuminated with the laser pulses with period 2t' to stimulate the sample. As a result, the laser radiation from the laser 13 undergoes Raman scattering. The scattered radiation is introduced to the interferometer 2. The radiation emerging from the interferometer 2 is guided to the detector 6, where the radiation is detected. Meanwhile, the clock signal having the period t' is sent from the timer 21 to the variable delay circuit 5 and delayed by $\Delta\tau'$ before application to the gate circuit 8. This gate circuit 8 operates in response to the delayed signal.

Figure 11:
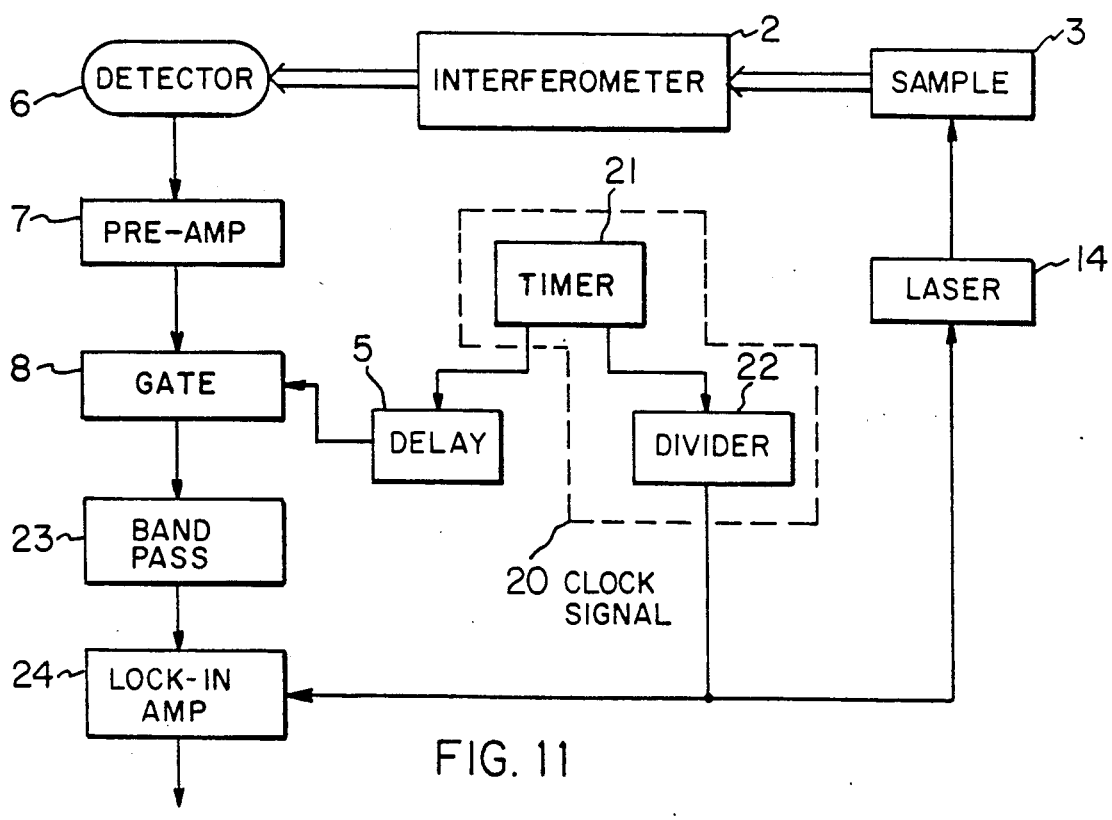

FIG. 11 shows a Fourier-transform photoluminescence spectrometer similar to the FT photoluminescence spectrometer shown in FIG. 6 except that a differential interferogram is taken.

Having thus described my invention with the detail and particularity required by the Patent Laws, what is claimed and desired to be protected by Letters Patent is set forth in the following claims.

What is claimed is:

1. A time-resolved infrared spectrophotometer comprising:
   a rapid scan interferometer;
   a stimulating means for periodically giving a stimulus to a sample placed in the optical path inside the interferometer;
   a delay means producing a trigger signal after a given delay with respect to the application of the stimulus;
   a detector detecting the radiation emerging from the interferometer;
   a sampling means which converts the output signal from the detector into a discrete form in response to the trigger signal;
   a means for detecting the envelope of the output signal from the sampling means; and
   a Fourier transform means which Fourier-transforms the output signal from the detecting means to obtain a spectrum.

2. The time-resolved infrared spectrophotometer of claim wherein said means for detecting the envelope is a low-pass filter.

3. The time-resolved infrared spectrophotometer of claim 1, wherein said means for detecting the envelope is an integrator circuit.

4. The time-resolved infrared spectrophotometer according to claims 1, 2 or 3, wherein said sampling means and said delay means together form a circuit component set, and wherein at least one similar circuit component set is added such that these circuit component sets are arranged in a side-by-side relation.

5. The time-resolved infrared spectrophotometer according to claims 1, 2 or 3, wherein said sample is placed as the light source for the rapid scan interferometer and stimulated to emit radiation by the stimulating means.

6. A time-resolved infrared spectrophotometer comprising:
- a rapid scan interferometer;
- a stimulating means for periodically giving a stimulus to a sample placed in the optical path inside the interferometer;
- a clock signal-generating means producing a first clock signal to be supplied to the stimulating means and a second clock signal having a frequency twice as high as the frequency of the first clock signal;
- a delay means delaying the second clock signal;
- a detector detecting the radiation emerging from the interferometer;
- a sampling means which converts the output signal from the detector into a discrete form in response to the output signal from the delay means;
- a band-pass filter the center frequency of which is equal to the frequency of the second clock signal and which receives the output signal from the sampling means;
- a lock-in amplifier synchronized with the second clock signal and receiving the output signal from the band-pass filter; and
- a Fourier transform means which Fourier-transforms the output signal from the lock-in amplifier to obtain a spectrum.

7. The time-resolved infrared spectrophotometer according to claim 6, wherein said sampling means and said delay means together form a circuit component set, and wherein at least one similar circuit component set is added such that these circuit component sets are arranged in a side-by-side relation.

8. The time-resolved infrared spectrophotometer according to claims 6 or 7, wherein said sample is placed as the light source for the rapid scan interferometer and stimulated to emit radiation by the stimulating means.

* * * * *

UNITED STATES PATENT AND TRADEMARK OFFICE
CERTIFICATE OF CORRECTION

PATENT NO. : 5,021,661
DATED : June 4, 1991
INVENTOR(S) : Koji Masutani

It is certified that error appears in the above-identified patent and that said Letters Patent is hereby corrected as shown below:

Title page, after Assignee: "Jeol Ltd." should read --JEOL Ltd.--.

Column 3 Line 66 after "and" insert --11--.

Column 4 Line 15 "poWer" should read --power--.

Column 4 Line 52 before "F(x)" delete --i--.

Column 4 Line 61 "F(x)" should read --F'(x)--.

Column 7 Lines 53 "between ferogram" should read
     --between an interferogram--.

Claim 2 Line 67 Column 8 after "claim" insert --1,--.

Signed and Sealed this

Twenty-sixth Day of January, 1993

Attest:

STEPHEN G. KUNIN

*Attesting Officer*   *Acting Commissioner of Patents and Trademarks*